United States Patent [19]

Urban

[11] 4,356,897
[45] Nov. 2, 1982

[54] WEAR INDICATOR FOR DISC BRAKES
[75] Inventor: John A. Urban, Livonia, Mich.
[73] Assignee: Eaton Corporation, Cleveland, Ohio
[21] Appl. No.: 309,878
[22] Filed: Oct. 9, 1981

Related U.S. Application Data

[63] Continuation of Ser. No. 151,008, May 19, 1980, abandoned, which is a continuation of Ser. No. 974,283, Dec. 29, 1978, abandoned.

[51] Int. Cl.$^3$ .............................................. F16D 66/02
[52] U.S. Cl. .................................. 188/1.11; 188/72.8
[58] Field of Search .................... 188/1.11, 71.9, 72.6, 188/72.7, 72.8, 196 BA; 116/208

[56] References Cited

U.S. PATENT DOCUMENTS

| | | | |
|---|---|---|---|
| 2,669,327 | 2/1954 | Chamberlain et al. | 188/71.9 |
| 2,820,530 | 1/1958 | Chouings et al. | 188/72.7 |
| 2,966,964 | 1/1961 | Brueder | 188/71.9 |
| 3,055,456 | 9/1962 | Pfeiffer | 116/208 |
| 3,467,228 | 9/1969 | Knights | 188/71.9 |
| 3,952,844 | 4/1976 | Newstead et al. | 188/72.8 |
| 3,966,028 | 6/1976 | Anderson et al. | 188/71.9 |
| 3,998,295 | 12/1976 | Martin | 188/1.11 |

FOREIGN PATENT DOCUMENTS 2522625 12/1976 Fed. Rep. of Germany ..... 188/72.8

Primary Examiner—Douglas C. Butler
Assistant Examiner—R. R. Diefendorf
Attorney, Agent, or Firm—C. H. Grace; F. M. Sajovec

[57] ABSTRACT

A lining wear indicator for a disc brake of the type including a transversely disposed bridge bar carried on the outboard end of a push rod assembly and bearing against the inboard face of the inboard brake pad. The lining wear indicator comprises a pair of pins secured at their outboard ends to the respective radially outer ends of the bridge bar and extending axially inboard through aligned bores in the inboard web of the caliper to provide, as a function of the length of pin exposed inboard of the inboard caliper web, a measure of the remaining thickness of the brake pads.

4 Claims, 4 Drawing Figures

U.S. Patent  Nov. 2, 1982  Sheet 1 of 2  4,356,897
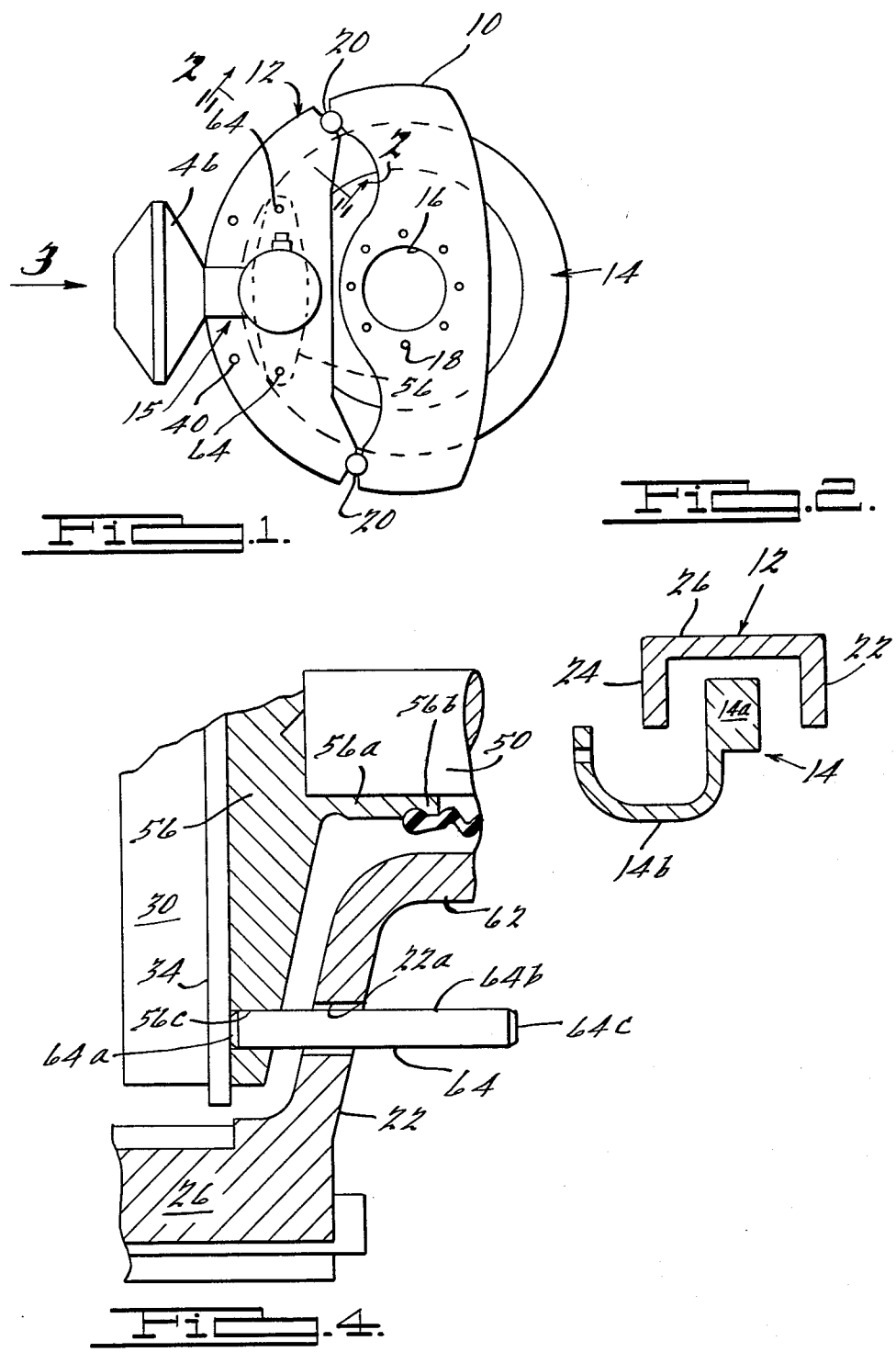

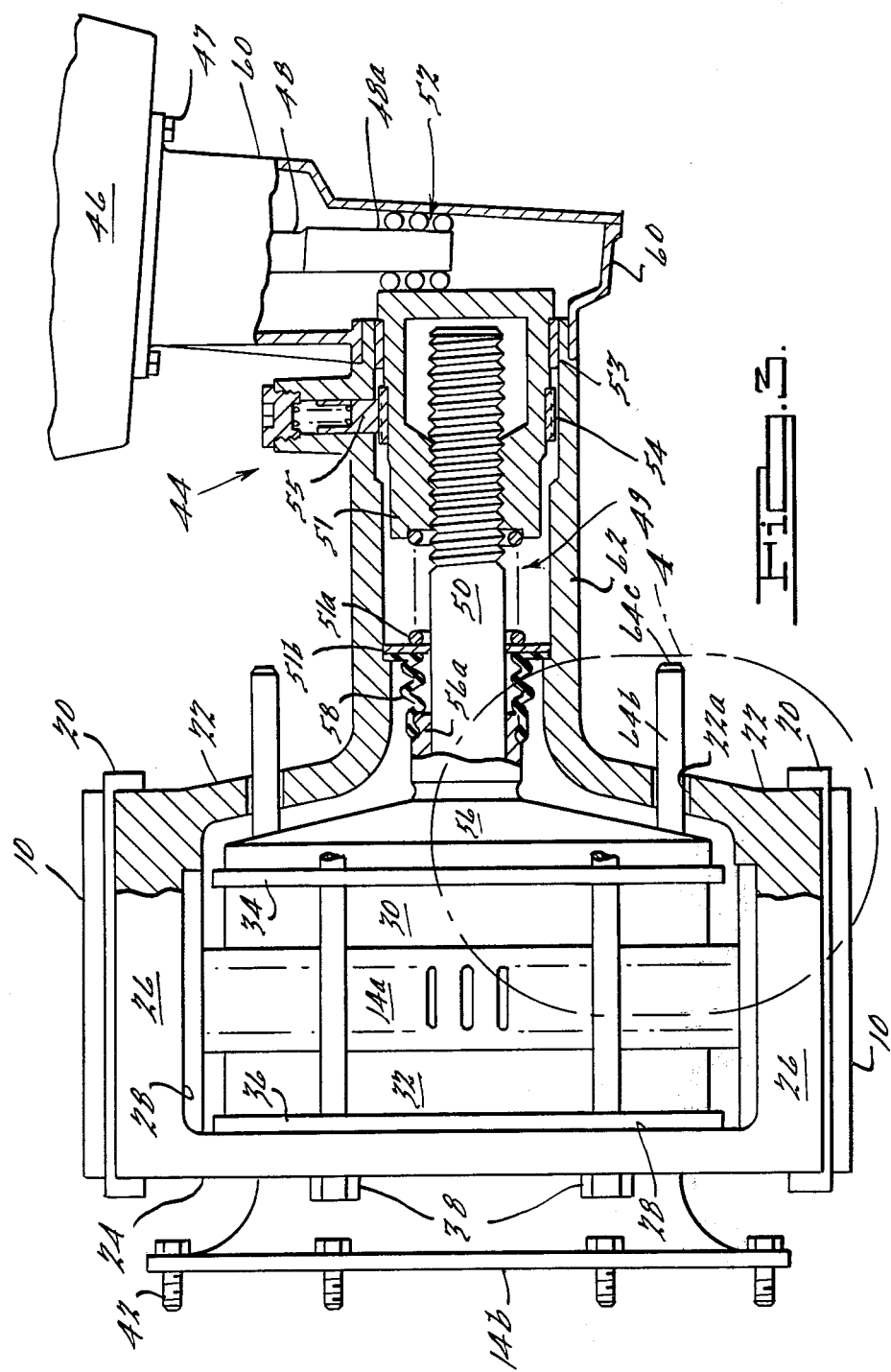

WEAR INDICATOR FOR DISC BRAKES

This is a continuation, of application Ser. No. 151,008, filed May 19, 1980, now abandoned, which was a Continuation of Application Ser. No. 974,283 filed Dec. 29, 1978, now abandoned.

BACKGROUND OF THE INVENTION

This invention relates to a wear indicator for disc brakes. More particularly, it relates to a wear indicator for disc brakes of the type intended for heavy duty truck applications.

Lining wear can be readily checked in a drum type brake by either, as in passenger car applications, removing the wheel or, as in heavy duty truck applications, viewing the shoe thickness through a view port provided in the wheel expressly for that purpose. Lining wear in a disc brake passenger car application can be readily checked by removing the wheel. However, checking the lining wear in a disc brake heavy duty truck application is extremely difficult. Specifically, it is not feasible to use a viewing port as in the case of drum brakes since the disc brake pads, by virtue of their orientation, reveal their thickness only when viewed in a fore and aft direction, and viewing in this direction is blocked by the tire. And removing the wheel—or wheels—of a heavy duty truck is a time consuming and expensive task, requiring removal of the associated drive axle shaft, replacement of lost axle lubricant, and lifting of a tire/wheel mass weighing upwards of 400 pounds. Whereas various systems have been proposed for checking lining wear on a heavy duty truck disc brake application without removing the wheel assembly, the proposed systems have been complicated, expensive, or ineffective and, accordingly, none have met with any substantial degree of commercial success.

SUMMARY OF THE INVENTION

It is an object of the present invention to provide an improved lining wear indicator for disc brakes.

It is a more specific object to provide a disc brake lining wear indicator that is extremely simple and inexpensive and yet extremely effective.

A yet more specific object is to provide a disc brake lining wear indicator that allows ready checking of lining thickness in heavy duty truck applications without removal of the wheel assemblies.

The invention wear indicator is intended for use in a disc brake of the type including a "caliper" housing section embracing the outer periphery of the disc, a generally tubular housing section extending axially inwardly from the inboard face of the inboard web of the caliper, and a push rod assembly mounted within the tubular housing section and having a free outboard end projecting through the inboard web of the caliper to press the inboard brake pad against the inboard face of the disc in response to brake actuation. According to an important feature of the invention, a generally axially extending through bore is provided in the inboard web of the caliper radially outwardly of the tubular housing section, and an indicator pin has its outboard end positively positionally related to the inboard face of the inboard brake pad and extends axially from that end through the bore in the inboard caliper web to project its inboard end axially inwardly from the inboard face of the inboard caliper web at a location radially outwardly of the tubular housing section. The indicator pin thus provides, as a function of the length of pin exposed, a measure of the remaining thickness of the brake pads.

According to another feature of the invention, the push rod assembly includes a push rod threadably received in a coacting threaded member and the indicator pin is carried by a bridge bar secured to the free outboard end of the push rod. This arrangement allows the indicator pin to also function as an anti-rotation means for the push rod to allow axial movement of the push rod in response to rotation of the coacting threaded member, thereby eliminating the need for the conventional anti-rotation means between the backing plate of the brake pad and the bridge bar.

According to yet another feature of the invention, a pair of indicator pins are secured to the bridge bar, one adjacent each end of the bar, and the pins extend through bores in the inboard web of the caliper on opposite sides of the tubular housing section. This arrangement allows the indicator pins to also function as a bearing support for the outboard end of the push rod, thereby eliminating the need for the conventional outboard bearing means.

These and other objects, features and advantages of the invention will be apparent from the detailed description of the preferred embodiment and from the accompanying drawings.

BRIEF DESCRIPTION OF THE DRAWINGS

FIG. 1 is a side elevational view, looking from inboard to outboard, of an air disc brake embodying the wear indicator means of the present invention;

FIG. 2 is a cross sectional view taken on line 2—2 of FIG. 1;

FIG. 3 is a view, partially in section, looking in the direction of the arrow 3 in FIG. 1; and FIG. 4 is a view on an enlarged scale of the structure within the circle 4 of FIG. 3.

DESCRIPTION OF THE PREFERRED EMBODIMENT

The air disc brake assembly of FIG. 1 includes a torque plate 10, a caliper 12, a disc 14, and an actuator assembly 15.

Torque plate 10 includes a central opening 16 adapted to pass the axle housing of an associated vehicle and a plurality of bolt holes 18 for use in fastening the torque plate to a suitable flange on the vehicle axle housing.

Caliper 12 is mounted on torque plate 10 for limited sliding translatory movement on the torque plate in a direction generally parallel to the axis of the axle assembly. Various arrangements may be employed to provide the required sliding mounting of the caliper on the torque plate. The disclosed arrangement includes a pair of upper and lower guide pins 20. Further details of the disclosed arrangement are shown in U.S. patent application Ser. No. 974,185 assigned to the assignee of the present invention. Caliper 12, at the location of the section of FIG. 2, is generally C-shaped and includes inboard and outboard web portions 22, 24 disposed generally normal to the wheel axis of the associated vehicle on opposite sides of disc 14, and a spacer portion 26 interconnecting the web portions. As best seen in FIG. 3, caliper 12 is of the "open back" type, i.e., spacer portion 26 is not continuous but rather is broken to provide a window or opening 28 so that brake pads 30, 32 together with backing plates 34, 36 may be removed for replacement, without removing caliper 12, simply by removing a pair of bolts 38. Bolts 38 pass through outboard caliper web portion 24 and through suitable holes in backing plates 34, 36 for threaded engagement with threaded through bores 40 (FIG. 1) in inboard caliper web portion 22. As is typical of "open back" caliper designs, the caliper of the invention has a considerable arcuate extent as compared to closed back designs. As shown, caliper 12 has an arcuate extent, as scribed from the center of opening 16, of approximately 130 degrees (FIG. 1).

Disc 14, as best seen in FIG. 3, includes a peripheral rim portion 14a received between inboard and outboard brake pads 30, 32 and a flange portion 14b. Flange portion 14b includes a plurality of bolt holes for securing disc 14 to a wheel (not shown) of an associated vehicle as by bolts 42.

Actuator assembly 15 is carried by inboard caliper web portion 22. Actuator assembly 15 includes a generally L-shaped housing assembly 44 projecting axially inwardly from inboard web portion 22, an air motor 46 secured to the free end of housing assembly 44 by bolts 47, a wedge actuator member 48 driven by the air motor and a tappet or push rod assembly 49. Push rod assembly 49 includes a push rod 50 and an adjuster nut 51 threaded onto the inboard end of rod 50. Nut 51, and thereby push rod 50, is driven axially by a wedge portion 48a of actuator member 48 through a roller bearing assembly 52. A coil return spring 51a, positioned between the outboard face of nut 51 and the inboard face of a retainer ring 51b, functions to return the push rod assembly to its rest position following retraction of wedge actuator 48. An inboard bushing 53 journals the inboard end of push rod assembly 49 in housing 44, and a collar 54 is press fit on nut 51. Collar 54 is provided with an external helical ratchet thread and coacts with corresponding ratchet teeth on a spring loaded ratchet pawl 55 to provide, in known manner, automatic self adjustment of the push rod assembly in response to brake pad wear. See, for example, U.S. Pat. No. 3,068,964. The free or outboard end 55 of push rod 50 is received with a press fit in a central hub portion 56a of a bridge bar 56 (see also FIG. 4) which in turn acts against backing plate 34 of inboard brake pad 30 to press pad 30 against the inboard face of disc rim portion 14a and thereafter slide the caliper inboard, or to the right as viewed in FIG. 3, to in turn apply outboard pad 32 against the outboard face of disc rim portion 14a whereby to brake the wheel of the associated vehicle. A dust boot 58, secured at its outboard end to a flange portion 56b of bridge 56 and at its inboard end to retainer ring 51b, precludes contamination of the interior of housing assembly 44.

In the disclosed embodiment, housing assembly 44 is formed in two sections 60, 62. Inboard housing section 60 carries air motor 46, and houses wedge actuator 48. Outboard housing section 62 slideably receives push rod assembly 49 and is cast integrally with caliper 12 as a generally tubular housing section extending axially inwardly from the inboard face of the inboard web portion of the caliper. Housing section 60, and thereby air motor 46, are turned 90° out of their true position in FIG. 3 for purposes of clarity: the true orientation of housing section 60 and air motor 46 is seen in FIG. 1.

With particular reference now to FIGS. 3 and 4, a through axial bore 56c is provided in bridge bar 56 adjacent each end of the bar, and through axial bores 22a are provided in inboard caliper web portion 22 at opposite sides of tubular housing section 62 and in axial alignment with bores 56c. A steel indicator pin 64 is press fit at its outboard end 64a into each bore 56c and extends axially therefrom through the respective web portion bore 22a to project its inboard end 64b axially inwardly from the inboard face of web portion 22. Bores 22a are oversize with respect to pins 64. For example, if pins 64 are 7/16 inch in diameter, bores 22a should be approximately 17/32 inch in diameter to allow for a limited amount of "slop" in the overall system and preclude binding of the pins in the bores. The length of pins 64 is chosen such that the length of pin exposed inboard of web portion 22, with fresh pads 30 and 32 in place, is somewhat less than the combined thickness of fresh pads 30 and 32. The described arrangement will be seen to provide a positive positional relationship between the outboard ends of pins 64 and the inboard face of the inboard pad. As wear occurs in pads 30, 32, bridge bar 56 (by virtue of the self adjusting action of pawl 55, collar 54, adjuster nut 51, and push rod 50) will follow pad 30 and, specifically, will move outboard, or to the left as viewed in FIG. 3. At the same time, caliper 12 will move inboard along pins 20 in response to wear occurring in outboard pad 32. Both of these wear induced movements, i.e., the outboard movement of bridge bar 56 and the inboard movement of caliper 12, will have the effect of gradually swallowing pins 64 within caliper 12 and thereby gradually reducing the length of pin exposed. The length of pin exposed, and thereby the pad thickness remaining, can be readily determined at any given time, either visually or tactilely. When the pads have worn down to what has been predetermined to be a minimum safe operating thickness, the pins will have been completely swallowed by the caliper so that the inboard tip 64c of the pins will be flush with the inboard face of inboard caliper web 22. When this flush configuration is observed or felt, it is time to change the pads. It will be apparent that the desired predetermined minimum pad thickness will dictate the amount by which the combined thickness of the fresh pads exceeds the length of originally exposed pin. For example, if the fresh pads are each one inch thick and it is desired to change pads when they wear down to a thickness of one-eighth inch, the length of pin originally exposed will be 1¾ inches.

In addition to providing an accurate and ready means of determining remaining pad thickness, pins 64 also provide a means of precluding rotation of push rod 50. Since the self adjusting mechanism requires that rod 50 be held against rotation, and thereby the axially advanced, as adjuster nut 51 is rotated by ratchet pawl 55, pins 64, by precluding such rotation, enable the operation of the self adjusting mechanism. Previous arrangements for precluding such rotation, such as interlocking connections between the bridge bar and the inboard backing plate, are thereby obviated.

Pins 64, by virtue of their even spacing on either side of the central axis of push rod 50, also provide an effective outboard bearing for push rod assembly 49, thereby eliminating the need for the conventional outboard push rod assembly bushing.

Whereas a preferred embodiment of the invention has been illustrated and described in detail, it will be apparent that various changes and modifications may be made in the preferred embodiment without departing from the scope or spirit of the invention. For example, although actuator housing section 62 has been disclosed as a casting formed integrally with the caliper, it will be apparent that this housing section may be formed as a separate part and secured to the caliper as by bolting, in which event the bolt flange of the separate housing would, in effect, constitute a portion of the inboard web of the caliper and the indicator pins, even if arranged to pass through bores in the bolt flange of the separate housing, would still, in effect, be passing through bores in the inboard web of the caliper. Further, whereas the invention lining wear indicator has been described in connection with a brake mechanism having a self adjusting provision so that the bridge bar effectively follows the brake pads as the latter undergo wear, the invention wear indicator is also applicable to a brake that does not include a self adjusting mechanism provided, however, that the invention wear indicator, in the case of a non self adjusting brake, will provide an accurate indicator of lining wear only when the brake is actually applied.

What is claimed is:

1. A vehicular disc brake comprising:
   (A) a housing structure including
       (1) a caliper housing section adapted to carry inboard and outboard pads for coaction with the opposite faces of a disc secured to a wheel of an associated vehicle and including inboard and outboard web portions disposed generally normal to the wheel axis of the associated vehicle on opposite sides of the disc, and
       (2) a generally tubular housing section extending radially inwardly from the inboard face of said inboard web portion for a distance substantially greater than the combined thickness of fresh inboard and outboard pads;
   (B) a push rod mounted slideably within said tubular section for reciprocal brake apply and release movement along a line of action generally parallel to said axis and having a free, outboard end projecting into an aperture in said inboard web portion;
   (C) a coacting threaded member threadably engaging said push rod at a location thereon inboard of said outboard end;
   (D) a bridge bar on the free outboard end of said push rod forming a T-configuration with the push rod and adapted to press the inboard brake pad against the inboard face of the disc in response to brake apply movement of said push rod;
   (E) means defining a pair of generally axially extending through bores in said inboard web portion on opposite sides of said tubular housing section; and
   (F) a pair of pins secured at their outboard ends to laterally spaced locations on said bridge bar and extending axially therefrom respectively through said bores to project their inboard ends axially inwardly from the inboard face of said inboard web portion at opposite sides of said tubular housing section for a distance generally equivalent to the combined thickness of said fresh inboard and outboard pads whereby to provide, as a function of the length of pin exposed, a measure of the remaining thickness of the brake pads, further provide a means of precluding rotation of said push rod to enable axial movement of said push rod in response to rotation of said coacting threaded member, and further provide bearing support for the outboard end of said push rod.

2. A disc brake according to claim 1 wherein
   (G) the outboard ends of said pins are received with a press fit in through axial bores provided in said bridge bar adjacent each end of said bar.

3. A vehicular disc brake comprising:
   (A) a housing structure including
       (1) a caliper housing section carrying inboard and outboard pads for coaction with the opposite faces of a disc secured to the wheel of an associated vehicle and including inboard and outboard web portions adapted to be disposed generally normal to the wheel axis of the associated vehicle on opposite sides of said disc and a spacer portion interconnecting said web portions but defining an opening through which the pads can pass for replacement purposes, and
       (2) a generally tubular housing section extending axially inwardly from the inboard face of said inboard web portion for a distance substantially greater than the combined thickness of fresh inboard and outboard pads;
   (B) inboard and outboard backing plates carried by and positioned within said caliper housing on opposite sides of the disc with the inboard and outboard pads respectively secured to the inboard and outboard plates and with the inboard plate presenting a flat inboard face generally normal to said axis;
   (C) a push rod mounted slidably within said tubular section for reciprocal brake apply and release movement along a line of action generally parallel to said axis and having a free outboard end projecting into an aperture in said inboard web portion;
   (D) a coacting threaded member threadably engaging said push rod at a location thereon inboard of said outboard end;
   (E) a bridge bar on the free outboard end of said push rod having a flat outboard face generally normal to said axis positioned to press against the flat inboard face of the inboard backing plate, whereby to press the inboard pad against the inboard face of the disc in response to brake apply movement of said push rod, but allowing free movement of said backing plate relative to said bridge bar in a direction normal to said axis, whereby to allow direct removal of said inboard backing plate and associated pad by movement thereof in said normal direction through the opening in the spacer portion of the caliper housing section;
   (F) means defining at least one generally axially extending through bore in said inboard web portion externally of said tubular housing section; and
   (G) at least one pin secured at its outboard end to said bridge bar and extending axially therefrom through said bore to project its inboard end axially inwardly from the inboard face of said inboard web portion externally of said tubular housing section for a distance generally equivalent to the combined thickness of said fresh inboard and outboard pads whereby to provide, as a function of the length of pin exposed, a measure of the remaining thickness of the brake pads, and further provide a means of precluding rotation of said push rod to enable axial movement of said push rod in response to rotation of said coacting threaded member.

4. A vehicular disc brake according to claim 3 wherein:
   (J) said bridge bar forms a T-configuration with the push rod;
   (K) said at least one through bore comprises a pair of through bores provided in said inboard web portion on opposite sides of said tubular housing section; and (L) said at least one pin comprises a pair of pins secured at their outboard ends to laterally spaced locations on said bridge bar and extending axially therefrom respectively through said bores to project their inboard ends axially inwardly from the inboard face of said inboard web portion at opposite sides of said tubular housing section and thereby provide, in addition to the wear indicator and antirotation functions, bearing support for the outboard end of the push rod.

* * * * *